May 8, 1934.   H. STYRI   1,958,025
ART OF MAKING BEARING CAGES AND THE PRODUCT THEREOF
Filed July 7, 1932   2 Sheets-Sheet 1

INVENTOR
HAAKON STYRI
BY
ATTORNEY

May 8, 1934.  H. STYRI  1,958,025

ART OF MAKING BEARING CAGES AND THE PRODUCT THEREOF

Filed July 7, 1932   2 Sheets-Sheet 2

INVENTOR
HAAKON STYRI
BY
ATTORNEY

Patented May 8, 1934

1,958,025

UNITED STATES PATENT OFFICE 1,958,025

ART OF MAKING BEARING CAGES AND THE PRODUCT THEREOF

Haakon Styri, Philadelphia, Pa., assignor, by mesne assignments, to S K F Industries, Inc., Philadelphia, Pa., a corporation of Delaware Application July 7, 1932, Serial No. 621,132

11 Claims. (Cl. 148—12)

This invention relates to anti-friction bearing cages and to a method of producing them, and has for an object to provide deep drawn, worked and swaged, quenched and spring tempered, medium carbon steel bodies, an example of which is a form of cage for use in separating and retaining the rolling elements of anti-friction bearings, having a body portion of annular shape carrying spring fingers having their outer ends formed for application to the rolling elements, after these have been assembled and evenly spaced between the inner and outer race rings, by being spread outwardly in contact with the rolling elements and then permitted to snap down into their original positions, each finger occupying a position between two of such elements to separate them and its specially formed end extending sufficiently beyond the largest cord in the median plane of the rolling element and cage pockets to retain the parts in assembled relation.

Drawings for the purpose of illustrating several of the mechanical steps preferably followed in practicing this art or method, and also illustrating examples of deep drawn bodies resulting therefrom, accompany this specification. Such drawings of steps show two methods, in one of which a circular blank of sheet metal is cut and afterwards cold drawn into a cup shape and afterwards notched and otherwise worked upon. The other blank, while circular, is circumferentially notched while flat for setting off the fingers.

Figure 11:
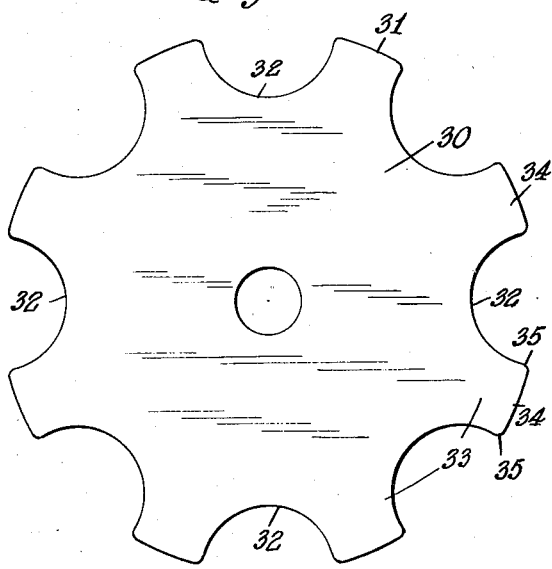
Figure 12:
Figure 13:
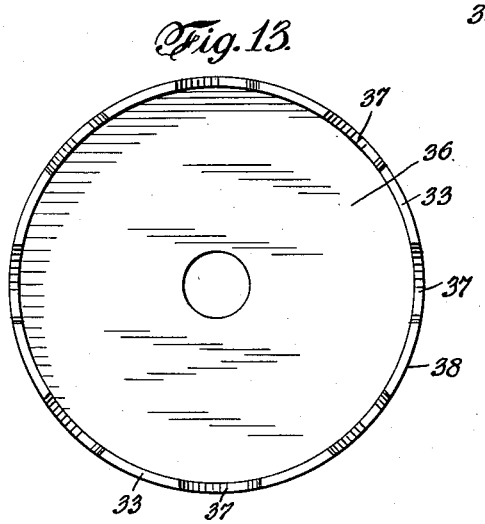
Figure 14:
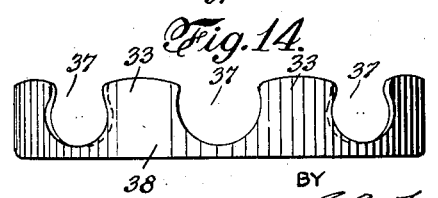

Figs. 11 and 12 show a face view and an edge view of a developed blank for use in carrying out the drawing method by somewhat different steps, and Figs. 13 and 14 show the article after it has been cold drawn from the blank of Figs. 11 and 12.

The succeeding operations under this method may be similar to those represented in Figs. 7 and 8, and 9 and 10.

Figure 9:
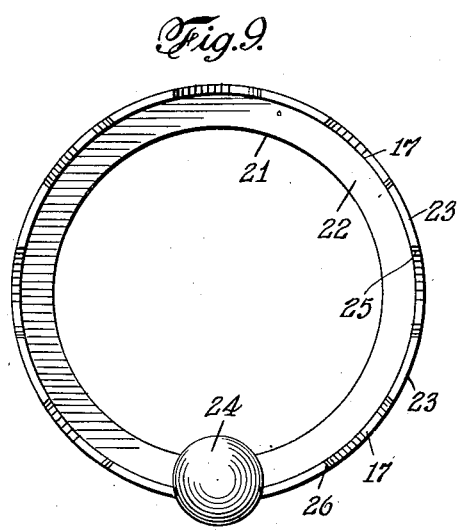
Figs. 9 and 10 show the cup of Figs. 7 and 8 during the operation of coining or swaging the sides of the fingers for furnishing smooth contacting surfaces for the rolling elements.
Figure 10:
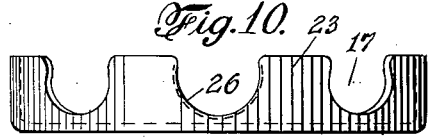

For convenience I shall describe my improved method in relation to one example of the product which is my invention, namely that referred to in the preamble of the specification, a cage for an anti-friction bearing, and have chosen for the illustrative example a cage for a ball bearing. Owing to the fact that the cage is applied to the balls by being snapped onto them or by having the rolling elements snapped into the pockets, I have referred to this cage as a snap cage. The finished product, illustrated in Figs. 9 and 10, is deep drawn sheet steel and in its finished form is spring tempered. It is assumed that the device illustrated in Figs. 9 and 10 is made of steel which, having been cold drawn and finished into the shape illustrated, may be spring tempered before the cage is put into use.

Although there are some prior patents for cages which are designed to snap with spring action onto the balls when these are assembled within the rings of a bearing in somewhat the same manner as does this cage, or for rolling elements to be snapped into pockets, yet none of the cages of those prior patents ever actually went into commercial use because of the fact that when made of the low carbon steels then available to the manufacturer for deep cold working they did not have the springiness or resiliency necessary to bring the fingers back into their original or desired positions after having been spread in passing over the balls. The steels at that time which were on the market, if capable of being quenched and spring tempered were incapable of being cold drawn into the proper shape and those steels which were capable of being cold drawn into the proper shape were incapable of being given satisfactory spring temper. My discovery is that by selecting the proper material it is perfectly practicable to form a snap cage so that if it is properly heat treated it is operative and can be economically manufactured commercially. A steel which I selected is known as a medium carbon steel.

I thereupon decided that the requirement for this work was a steel mild enough to be subjected to deep cold drawing operation, and after such drawing to be capable of heat treatment giving the steel a characteristic spring temper or spring quality, and for this purpose I employed a sheet steel which is commercially sold, known as S A E No. 1045, which I found to be satisfactory. This steel has been used for a considerable time in the automobile industry, particularly for forgings and similar machine parts, and the analysis for this S A E specification is .40 to .50 carbon and .50 to .80 manganese. Steels of similar composition and even with a carbon content outside these limits down to .35 and up to .60 can be used for this purpose. The S A E steel specifications No. 1040 and No. 1050 practically cover these limits. The carbon content of No. 1040 is .35 to .45 and of No. 1050 it is .45 to .55. I have not been able in one operation to cold form cups with higher carbon content even when very carefully annealed. On the other hand I have not been able to quench and temper steels with a carbon content less than .35 to give a satisfactory springiness of the prongs or fingers. It has only been during the last few years that sufficient has been learned about properly annealing such steels to give a structure which will permit deep drawing cold to the extent desired in this case.

Figure 1:
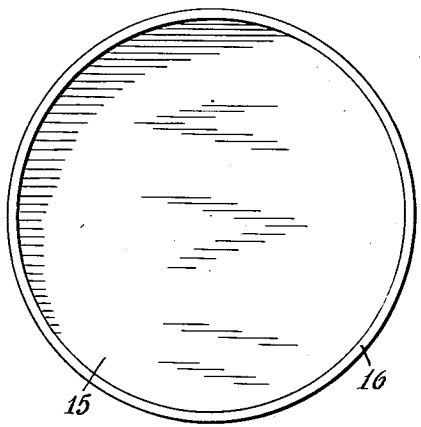
Figs. 1 and 2 show respectively a top view and a side view as the result of the first operation in which the blank has been cut from the stock and deep cold drawn into a cup having a flat bottom and a substantially vertically disposed flange or side.
Figure 3:
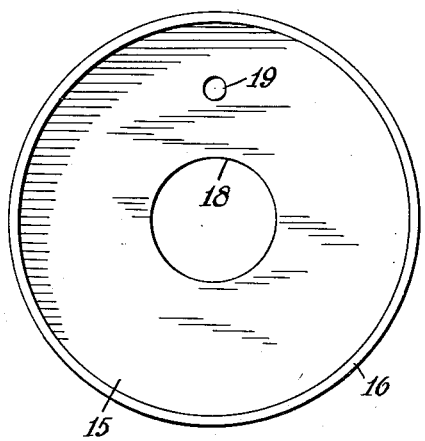
Figs. 3 and 4 show the second operation, the bottom of the cup of Figs. 1 and 2 having been pierced for locating and driving purposes.
Figure 2:
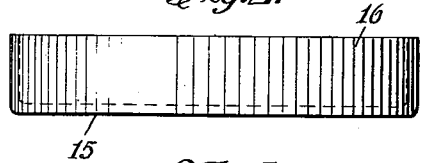
Figure 4:
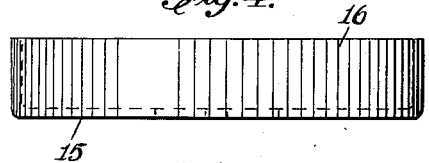
Figure 6:
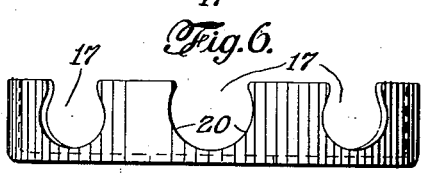

The steps of the operation of forming the blank and passing on to the finished cage are fairly well outlined in the description of the figures of the drawings, but it will not be amiss to state that in Figs. 1 and 2 a cup has been represented which has been deep drawn presenting a flat bottom portion 15 having a vertically disposed upstanding flange 16 in which the notches 17, represented in Fig. 6, are designed to be cut. This may be regarded as the first operation. The second operation is shown in Figs. 3 and 4 in which the bottom 15 of the cup is centrally pierced at 18 and is also pierced with a smaller hole 19. These are for use in driving and indexing the piece in its subsequent operations.

Figure 5:
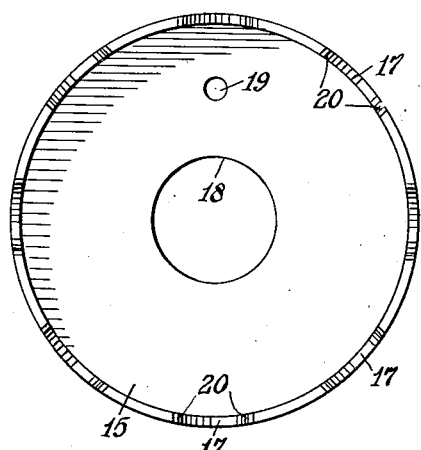
Figs. 5 and 6 represent the cup of Figs. 3 and 4 after the finger setting off notches have been formed.

The third operation is represented in Figs. 5 and 6, in which operation the piece has been properly located by means of the center hole 18 and has been indexed around by aid of the hole 19, during the operation of forming the notch 17 in the flange 16. These notches may conveniently be produced by the notching punch passing from the inside through the flange 16 in a radial direction, the result of which is that the generatrix of the side walls 20 of the notches are parallel.

Figure 7:
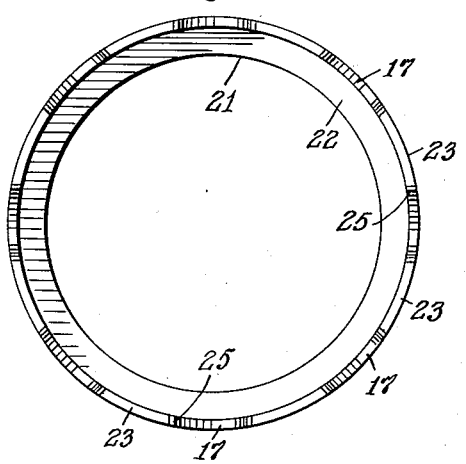
Figs. 7 and 8 show the cup of Figs. 5 and 6 after the center hole has been pierced.
Figure 8:

In the fourth operation, represented in Figs. 7 and 8, the larger portion of the bottom of the cup is removed, technically this is known as piercing the center hole 21, which leaves a substantially flat annular body 22 carrying the fingers or prongs 23 which are disposed at about right angles to the flat face of the annular body 22.

There is an essential point in making the snap steel cages which influences their life very much, which is that the edges which are to come in contact with the rolling elements of the bearing are chamfered by being swaged or coined, and this operation is done by pressing one of the rolling elements which it is intended to use, or one which is similar, in the illustration a ball 24, against the inner edge 25 of the notch, while the outside of the cup is supported by a suitable die. All the coining elements should be pushed radially at the same time for greater accuracy. In reality this notch forms the ball pocket of the cage. By using a ball in a swaging or coining operation of approximately the size of the balls for which the cage is designed, a chamfered edge 26 is produced which, when the parts are properly proportioned, corresponds in dimension with the portion of the ball or rolling element which will be contacted by the cage when this is in use.

The next step or operation is that of quenching from above the critical temperature and tempering to spring quality the otherwise completed cage, which operations, of course, would be difficult of delineation in a Patent Office drawing.

Another method of producing a cage is represented in Figs. 11 to 14 inclusive. In Figs. 11 and 12 a flat blank 30 is illustrated having a generally circular edge 31 in which has been developed a number of notches 32 which eventually become the ball pockets.

These notches set off the fingers 33, each of which has an enlarged outer end 34, the corners 35 of which are designed when the cage of the form illustrated in Figs. 10 and 14 is applied to the rolling elements to bring the fingers outwardly permitting the corners to ride over the outer surface of the balls. The fingers, after the corners have passed the maximum cord of the balls in the median symmetry plane of the bearing, snap down into their original positions, each finger occupying a position between two of the balls to separate them and the enlargement 34 at the end and its corners 35 extending beyond the balls to retain the parts in assembled relation.

In Figs. 11 and 12 the blank illustrated may be regarded as the first operation, the second operation being illustrated in Figs. 13 and 14 which shows the fingers 33 bent up into a position substantially at right angles to the bottom 36 of the cup which is substantially flat having retained the plane of the original blank 30. The notches 32 and the blank are developed with such nicety that the notches 37 are of approximately the desired shape for the finished cage and the side wall 38 of which notch is substantially parallel throughout and disposed radially of the blank.

From this point on the operation, in carrying out this developed blank method, is substantially similar to the steps taken in connection with the notching method heretofore described.

Having thus described my invention, what I claim and desire to secure by Letters Patent is:

1. The art of producing cold deep worked and spring tempered sheet steel anti-friction bearing cages, which consists in employing a sheet of medium carbon steel, stamping a blank from such sheet and cold deep working the same into a cage having the desired bodily form, then hardening the cage and then tempering it by heat treatment to spring quality.

2. The art of producing cold deep worked and spring tempered sheet steel anti-friction bearing cages, which consists in employing a sheet of medium carbon steel, stamping a blank from such sheet and cold deep working the same by a drawing operation into a cage having the desired bodily form, then hardening the cage and then tempering it by heat treatment to spring quality.

3. The art of producing anti-friction bearing cages, which consists in employing a sheet of medium carbon steel, stamping a blank from such sheet and cold deep working the same by a drawing operation into a cage having the desired bodily form, swaging and chamfering the contacting areas, then hardening the cage and then tempering it by heat treatment to spring quality.

4. As an article of manufacture, an anti-friction bearing cage, the product of cold deep working a sheet of medium carbon steel containing carbon within the following percentage range: .35 to .60 carbon, and then hardening and spring tempering the body formed thereby.

5. The art of producing cold deep worked and spring tempered sheet steel anti-friction bearing cages, which consists in employing a sheet of medium carbon steel, stamping a blank from such sheet and cold working the same into a body having a substantially flat annular portion and a series of vertically disposed fingers, and then heat treating such body by hardening and tempering whereby the fingers are rendered capable of snapping back into their original positions after having been sprung away from such positions upon assembly in an anti-friction bearing.

6. The art of producing cold deep worked and spring tempered sheet steel anti-friction bearing cages, which consists in employing a sheet of medium carbon steel, stamping a blank from such sheet, cold working the blank into a body having a substantially flat annular portion and a series of vertically disposed fingers, and then heat treating such body by hardening and tempering whereby the fingers are rendered capable of snapping back into their original positions after having been sprung away from such positions upon assembly in an anti-friction bearing.

7. As an article of manufacture, a cage for an anti-friction bearing it being the product of cold deep working a sheet of medium carbon steel and then hardening and spring tempering the cage formed thereby.

8. As an article of manufacture, a cage for an anti-friction bearing it being the product of cold deep working, by a drawing operation, a sheet of medium carbon steel and hardening and spring tempering the cage formed thereby.

9. As an article of manufacture, a cage for an anti-friction bearing it being the product of cold deep working a sheet of alloy steel containing as constituents and within the following percentage ranges: .35 to .60 carbon and .50 to .80 manganese, and hardening and spring tempering the cage formed thereby.

10. As an article of manufacture, a cage for an anti-friction bearing it being the product of cold deep working a sheet of alloy steel containing as constituents and within the following percentage ranges: .40 to .55 carbon and .50 to .80 manganese, and hardening and spring tempering the cage formed thereby.

11. As an article of manufacture, a cage for an anti-friction bearing it being the product of cold deep working a sheet of medium carbon steel into a body having a substantially flat annular portion and a series of vertically disposed fingers, such body having been heat treated by hardening and tempering, whereby the fingers have been rendered capable of snapping back into their original positions after being sprung away from such positions.

HAAKON STYRI.